United States Patent
Kwon et al.

(10) Patent No.: US 12,452,265 B2
(45) Date of Patent: Oct. 21, 2025

(54) INTRUSION DETECTION SYSTEM FOR IOT NETWORKS USING BLOCKCHAIN-ENABLED FEDERATED LEARNING AND OPERATING METHOD THEREOF

(71) Applicant: PUKYONG NATIONAL UNIVERSITY INDUSTRY-UNIVERSITY COOPERATION FOUNDATION, Busan (KR)

(72) Inventors: Ki Ryong Kwon, Busan (KR); Mamunur Rashid Md, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 126 days.

(21) Appl. No.: 18/510,105

(22) Filed: Nov. 15, 2023

(65) Prior Publication Data
US 2024/0171599 A1 May 23, 2024

(30) Foreign Application Priority Data
Nov. 21, 2022 (KR) .................. 10-2022-0156591

(51) Int. Cl.
*H04L 9/40* (2022.01)
*G06N 3/045* (2023.01)
*G06N 3/08* (2023.01)

(52) U.S. Cl.
CPC ......... *H04L 63/1416* (2013.01); *G06N 3/045* (2023.01); *G06N 3/08* (2013.01)

(58) Field of Classification Search
CPC ............ H04L 63/1416; H04L 63/1408; H04L 63/1425; G06N 3/045
(Continued)

(56) References Cited

U.S. PATENT DOCUMENTS

| | | | |
|---|---|---|---|
| 7,523,502 B1 * | 4/2009 | Kennedy ............... | G06F 21/554 709/201 |
| 2002/0032871 A1 * | 3/2002 | Malan .................... | H04L 43/00 726/23 |

(Continued)

OTHER PUBLICATIONS

Thien Duc Nguyen, D"IoT: A Federated Self-learning Anomaly Detection System for IoT, (2019) IEEE. pp. 756-767 (Year: 2019).*

(Continued)

*Primary Examiner* — Samson B Lemma
(74) *Attorney, Agent, or Firm* — Bridgeway IP Law Group, PLLC; Jihun Kim

(57) ABSTRACT

An intrusion detection system for an IoT network using blockchain-enabled federated learning (FL) and an operating method thereof are described. The intrusion detection system for the IoT network includes a plurality of local clients configured to be each interconnected with a plurality of Internet of Things (IoT) device groups to establish an individual IoT network, and a central server configured to be interconnected with the plurality of local clients and implemented on a blockchain network, wherein each of the plurality of local clients includes a local neural network model for intrusion detection, and updates a current local neural network model based on a global neural network model transmitted from the central server.

6 Claims, 4 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2013/0283374 A1* | 10/2013 | Zisapel | ............... | H04L 63/1441 726/22 |
| 2017/0331853 A1* | 11/2017 | Kawakita | ............ | H04L 63/1416 |
| 2020/0267146 A1* | 8/2020 | Nambiar | ................ | G06N 20/00 |
| 2021/0258328 A1* | 8/2021 | Appel | .................... | H04L 67/12 |
| 2021/0374617 A1* | 12/2021 | Chu | ........................ | G06N 20/20 |
| 2022/0043920 A1* | 2/2022 | Zhang | .................... | G06N 20/00 |
| 2022/0044117 A1* | 2/2022 | Song | ........................ | G06N 3/04 |
| 2022/0044162 A1* | 2/2022 | Zhang | ..................... | G06F 21/64 |
| 2022/0156368 A1* | 5/2022 | Spyridopoulos | ......... | G06N 3/08 |
| 2022/0215256 A1* | 7/2022 | Song | ........................ | G06N 3/08 |
| 2022/0318412 A1* | 10/2022 | Guo | ........................ | G06F 17/18 |
| 2023/0087863 A1* | 3/2023 | Gong | ............... | G06F 18/24133 |
| 2023/0169350 A1* | 6/2023 | Louizos | ................. | G06N 3/045 706/25 |
| 2023/0259812 A1* | 8/2023 | Jagyasi | .................. | G06N 20/00 706/13 |
| 2023/0319094 A1* | 10/2023 | Bakman | ................ | G06F 21/577 726/25 |
| 2023/0336436 A1* | 10/2023 | Zhang | ................... | H04L 41/082 |
| 2024/0177063 A1* | 5/2024 | Aizaki | .................... | G06N 20/00 |
| 2024/0250975 A1* | 7/2024 | Pourahmadi | ........ | H04L 63/1425 |

OTHER PUBLICATIONS

Eman Ashraf, "FIDChain: Federated Intrusion Detection System for Blockchain-Enabled IoT Healthcare Applications" (Jun. 2022) (Year: 2022).*

Mohanad Sarhan, "HBFL:A hierarchical blockchain-based federated learning frame work for collaborative IoT intrusion detection" University of Queensland, Sep. 2022 (Year: 2022).*

* cited by examiner

INTRUSION DETECTION SYSTEM FOR IOT NETWORKS USING BLOCKCHAIN-ENABLED FEDERATED LEARNING AND OPERATING METHOD THEREOF

CROSS-REFERENCE TO RELATED APPLICATION

This application claims priority to and the benefit of Korean Patent Application No. 10-2022-0156591, filed on Nov. 21, 2023, the disclosure of which is incorporated herein by reference in its entirety.

BACKGROUND

1. Field of the Invention

The present invention relates to a technology for detecting intrusions into an IoT network, and more particularly, to an intrusion detection system for an IoT network that can detect external attacks of various patterns and improve personal information protection by performing updates through blockchain-enabled federated learning while detecting intrusions into an IoT network.

2. Discussion of Related Art

The concept of Internet of Things (IoT) is designed to provide various intelligent network application programs and devices in various fields to enhance people's lives. In recent years, the development of IoT has increased the awareness of sophistication by encompassing computers, devices, businesses, vehicles, and even neighbors. Furthermore, IoT is a network system built on recognized standards for exchanging information.

Data collected from end devices enables the establishment of smart decision mechanisms and efficient management of IoT settings. However, connecting many real-world devices to the Internet can raise concerns about cybersecurity risks. Security is, therefore, the most important requirement for these real-time systems due to the possibility of unwanted intrusions, critical attacks, or errors.

An intrusion detection system (IDS) can be defined as a monitoring system that detects abnormal activity and sends an alert when detects the abnormal activity, and analyzes metadata contained in network packets and determines whether to allow traffic according to predetermined rules.

Traditionally, it has been an industrial standard practice to manage and analyze industrial data acquired from IoT and store the managed analyzed data in a database in a centralized manner. While this centralization is advantageous for management, it raises concerns about privacy and security. Although this strategy of centralizing data processing is advantageous for management, it raises concerns about privacy and security. it poses privacy and security concerns.

Recent research has emphasized the vulnerabilities of intrusion detection in various machine learning models where incorrect output predictions occur due to untraceable modifications in input data to fool machine learning algorithms.

Moreover, the traditional centralized methodology, where data is required to transmitted and processed by a single entity, has a problem of not being performed properly in some situations due to the availability of personal data, such as managing large amount of data for response time, and performance and scalability, including personal information protection and resource management.

Due to the amount and sensitivity of information shared by some devices in IoT scenarios, the above-described problems may be exacerbated. Therefore, there is a great need for a distributed solution for data management.

Federated learning (FL), a collaborative distributed learning approach that solves the personal information protection issue of traditional centralized ML approaches, was introduced in 2016, and is a model in which end devices (also known as clients or parties) are assembled by a global central device (also known as an aggregator or coordinator).

The use of FL-based intrusion detection algorithms has increased and is currently used for a variety of purposes. A drawback of current intrusion detection systems (IDS) is that they are set up to identify specific types of attacks and cannot adapt to new threats.

Because the FL approach shares model parameters through a model communication network, it poses a new type of vulnerability in that an attacker can change model parameters, but it does help alleviate some of the personal information issues associated with centralized ML techniques.

Therefore, a technology is required that can solve the personal information protection issue, which is a vulnerability of the traditional centralized ML technology, while preventing changes in the model parameters due to external attacks, which is a vulnerability of the FL approach.

The above-described background technology is technical information that the inventor holds for the derivation of the present invention or acquired in the process of deriving the present invention, and can not necessarily be a known technology disclosed to the general public prior to the filing of the present invention.

SUMMARY OF THE INVENTION

The present invention is directed to providing an intrusion detection system for an Internet of Things (IoT) network that can solve personal information protection issues, which are vulnerabilities of distributed and centralized machine learning (ML) approaches.

The present invention is also directed to providing an intrusion detection system for an IoT network that can be implemented to update model parameters by sharing only the model parameters rather than sharing user data with the outside to thereby protect user's personal information while allowing learning and interference to be completed on a client.

The present invention is also directed to providing an intrusion detection system for an IoT network that can prevent model parameter changes by external attacks, which is a vulnerability of Federated Learning (FL) approaches, by continuously updating the model parameters.

The present invention is also directed to providing an intrusion detection system for an IoT network that can generate a global model by integrating the trained learning content of multiple clients from a central global server and performing learning on the same, rather than limiting updates of a local model to a single client, and update the local model based on this, thereby detecting external attacks of various patterns.

The technical problem of the present invention is not limited to the foregoing, and the other technical problems will be understood clearly to those skilled in the art from the following description.

According to an aspect of the present invention, there is provided an intrusion detection system for an IoT network according to an embodiment of the present invention, including a plurality of local clients configured to be each interconnected with a plurality of IoT device groups to establish an individual IoT network, and a central server configured to be interconnected with the plurality of local clients and implemented on a blockchain network.

According to an embodiment, each of the plurality of local clients may include a local neural network model for intrusion detection, and update a current local neural network model based on a global neural network model transmitted from a central server.

According to an embodiment, each of the plurality of local clients may train the current local neural network model by using data collected from the IoT device group interconnected with each of the plurality of local clients as input, and transmit learning content to the central server.

According to an embodiment, the central server may generate a global neural network model updated by combining the learning content transmitted from each of the plurality of local clients, and transmit the updated global neural network model to each of the plurality of local clients.

According to an embodiment, the central server may include a plurality of nodes implemented on the blockchain network.

According to an embodiment, the plurality of nodes may generate an updated global neural network model based on the learning content transmitted from the local clients interconnected among the plurality of local clients and learning content transmitted from other nodes.

According to an embodiment, at the beginning of operation, the central server may generate an initial global neural network model by using data held by the central server itself, and transmit the generated global neural network model to each of the plurality of local clients.

According to an embodiment, each of the plurality of local clients may input data collected from the IoT device group interconnected with each of the plurality of local clients into the initial global neural network model to train the initial global neural network model, and generate an initial local neural network model.

According to another aspect of the present invention, there is provided an operating method of an intrusion detection system for an IoT network according to an embodiment, which detects an intrusion into an IoT network established by interconnecting each of a group of a plurality of IoT devices and each of a plurality of local clients with each other.

According to an embodiment, each of the plurality of local clients may include a local neural network model for intrusion detection.

According to an embodiment, the operating method of the intrusion detection system for the IoT network may include training, by each of the plurality of local clients, a current local neural network model by using data collected from the IoT device group interconnected with each of the plurality of local clients as input and transmitting learning content to a central server implemented on a blockchain network, generating, by the central server, a global neural network model updated by combining the learning content transmitted from each of the plurality of local clients and transmitting the generated global neural network model to each of the plurality of local clients, and updating, by each of the local clients, the current local neural network model based on the updated global neural network model.

According to an embodiment, the central server may include a plurality of nodes implemented on the blockchain network.

According to an embodiment, the generating, by the central server, the updated global neural network model may include generating, by the plurality of nodes, the global neural network model updated by combining the learning content transmitted from the local client interconnected among the plurality of local clients and learning content transmitted from other nodes.

According to an embodiment, the operating method of the intrusion detection system for the IoT network may further include generating, by the central server, an initial global neural network model by using data held by the central server itself at the beginning of operation and transmitting the generated initial global neural network model to each of the plurality of local clients, and inputting, by each of the plurality of local clients, data collected from the IoT device group interconnected with each of the plurality of local clients into the initial global neural network model to train the initial global neural network model and generating an initial local neural network model.

Specific details according to various examples of the present invention other than the means for solving the problems described above are included in the description and drawings below.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
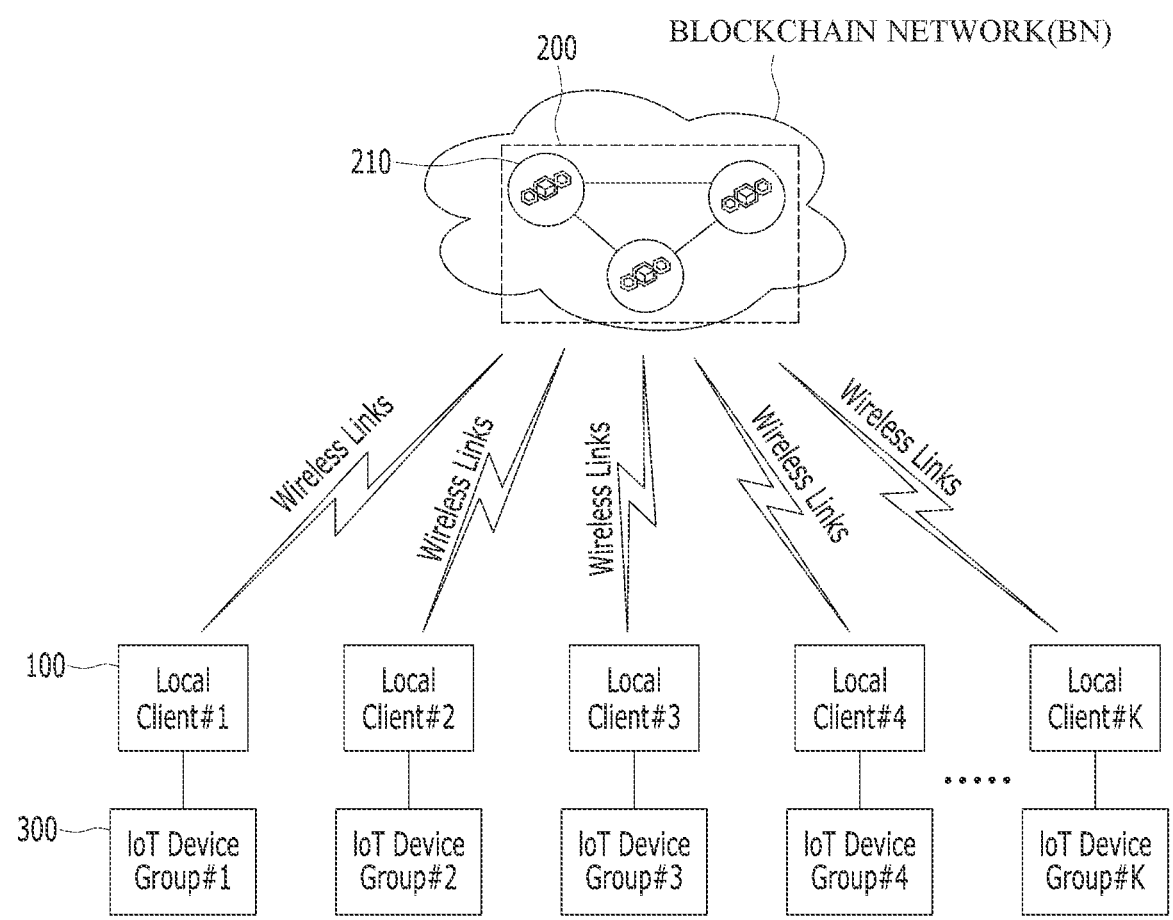
FIG. 1 is a diagram illustrating the configuration of an intrusion detection system for an Internet of Things (IoT) network using blockchain-enabled federated learning (FL) according to an embodiment of the present invention.

The advantages and features of the present disclosure and a method therefor will become apparent with reference to the embodiments described below in detail in conjunction with the accompanying drawings. However, the present disclosure is not limited to the embodiments disclosed below, but will be implemented in various different forms. The present embodiments are provided to only explain the disclosure of the present specification is complete, and to completely inform those of ordinary skill in the art of this specification the scope of the invention, and the specification will be defined by the scope of the claims.

The shape, size, ratio, angle, number, etc. disclosed in the drawings for explaining the embodiment in the present specification are exemplary and the embodiment of the present specification is not limited to the illustrated matters. Like reference numerals refer to like elements throughout the specification. In addition, in describing the embodiment, if it is determined that a detailed description of a related known technology may unnecessarily obscure the gist of the embodiment, the detailed description thereof will be omitted. In the case that the terms of 'include', 'have', 'consist', 'comprise' etc. are used in this specification, it should be understood as being able to add other parts or elements unless 'only' is used. When an element is expressed in the singular, there may be understood to include cases including the plural unless otherwise explicitly stated.

In addition, in interpreting the elements, it should be interpreted as including an error range even if there is no separate explicit description.

In the case of a description of a temporal relationship, for example, when a temporal relationship is described as 'after', 'following', 'next', 'then', 'before', it may include cases that are not continuous unless 'immediately' or 'directly' is used.

When the terms, such as "first", "second", or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

In addition, when describing the components of the present invention, terms such as "first", "second", "A", "B", "(a)" and "(b)" may be used herein. These terms are only used to distinguish one component from another component, and these terms do not limit the nature, order, or number of the corresponding components. When one component is described as being "connected", "coupled", or "connected" to another component, one component can be directly connected, coupled or connected to another component. However, it is also to be understood that an additional component can be "interposed" between the two components, or the two components can be "connected", "coupled", or "connected" through an additional component.

The term "at least one" should be understood to include all possible combinations of one or more related elements. For example, the meaning of "at least one of the first, second, and third elements" may mean all combinations of two or more elements of the first, second and third elements as well as each of the first, second or third element.

The features of each of the embodiments of the present specification may be partially or wholly combined or coupled with each other, and may be various technically linked or operated. In addition, each of the embodiments may be implemented independently of each other or may be implemented together in a related relationship.

Hereinafter, it will be described embodiments according to the present invention with reference to the drawings. In addition, since the scales of the components shown in the accompanying drawings may have different scales from the actual for convenience of description, the scales shown in the drawings are not limited thereto.

Hereinafter, an intrusion detection system for an Internet of Things (IoT) network using blockchain-enabled federated learning (FL) according to an embodiment of the present invention and operating method thereof will be described with reference to the attached drawings.

FIG. 1 is a diagram illustrating the configuration of an intrusion detection system for an IoT network using blockchain-enabled FL according to an embodiment of the present invention.

Referring to FIG. 1, an intrusion detection system for an IoT network according to an embodiment of the present invention may be implemented to update a neural network model for intrusion detection through blockchain-enabled federated learning (FL), and include a plurality of local clients 100 and a blockchain-enabled central server 200.

Each of the plurality of local clients 100 according to the embodiment may be interconnected with an individually connected IoT device group 300 to detect external intrusion into the IoT device group 300.

Each of the plurality of IoT device groups 300 may include one or more IoT devices.

The local client 100 and the IoT device group 300 may be paired, and the paired local client 100 and IoT device group 300 may establish a network (IoT network).

The local client 100 may learn (or train) a local neural network model (hereinafter referred to as local neural network model) for IoT network intrusion detection based on data collected from the IoT device group 300, thereby allowing the local neural network model to detect intrusions from the outside.

The neural network model according to an embodiment of the present invention may be a convolutional neural network (CNN) or a recurrent neural network (RNN), but is not limited thereto.

For example, the central server 200 may generate an initial global neural network model using its own IoT-related data, and the initial global neural network model may be transmitted (or distributed) to each of the plurality of local clients 100. Here, the central server 200 may generate an initial weight w when generating the initial global neural network model and transmit the generated initial weight to the plurality of local clients 100.

The local client 100 may transmit learning content (or updated model parameters) to the blockchain-enabled central server 200, and update the local neural network model based on a global neural network model for IoT network intrusion detection (hereinafter referred to as global neural network model) transmitted from the central server 200.

Here, the global neural network model may be generated by performing learning on learning content transmitted from each of the plurality of local clients 100.

The local neural network model may be generated (or updated) by one local client 100, and since the learning data of the local neural network model is limited to the data collected from the IoT device group 300, the intrusion detection performance of the local neural network model is inevitably limited.

However, since the global neural network model is generated by performing learning on the learning content transmitted from the plurality of local clients 100, the global neural network model can be generated based on a larger amount of learning data than the learning data of the local neural network model.

Therefore, the intrusion detection performance of the global neural network model is higher than that of the local neural network model, and the intrusion detection performance of the local client 100 can be improved by updating the local neural network model based on the global neural network model.

In addition, since the plurality of local clients 100 are connected to different IoT device groups 300, the types of the data collected by the plurality of local clients 100 may be different.

Accordingly, the learning content of the local neural network model for each of the plurality of local clients 100 is different, and the types of intrusions detectable by the global neural network model generated by performing learning on a large amount of different learning content may be more diverse than the types of intrusions detectable by the local neural network model.

The central server 200 according to an embodiment of the present invention is built based on a blockchain, and may include a plurality of nodes 210 implemented on a blockchain network (BN).

The central server 200 may generate the global neural network model by performing learning based on the learning content from the plurality of local clients 100, and transmit the global neural network model to each of the plurality of local clients 100.

According to the embodiment, the plurality of nodes 210 of the central server 200 may perform learning based on the learning content transmitted from the local client 100 and learning content transmitted from other nodes, thereby generating the global neural network model.

The plurality of nodes 210 may generate the global neural network model updated with optimized parameters by combining the learning content and performing learning on the learning content, and transmit the global neural network model to the connected local client 100.

The global neural network model of the central server 200 may be continuously updated based on new learning content from the local client 100, and since the updated global neural network model is transmitted back to the local client 100, the local neural network model of the local client 100 may also be continuously updated and improved.

For example, each of the local clients 100 may transmit the weights of the model to the central server 200, and the central server 200 may also transmit the weights to the local client 100.

Here, the weight may refer to a set of variables that can be learned, and the central server 200 may improve the global neural network model using the collected weights.

In addition, the Federated Averaging (FedAvg) algorithm can be used for such federated learning, but is not limited to this, and various algorithms such as the FedMA algorithm and the FedProx algorithm can be applied. However, since the operating method of federated learning using weights and the application of the above-described algorithm are widely known to those skilled in the art, further detailed description thereof will be omitted in the present invention.

Figure 2:
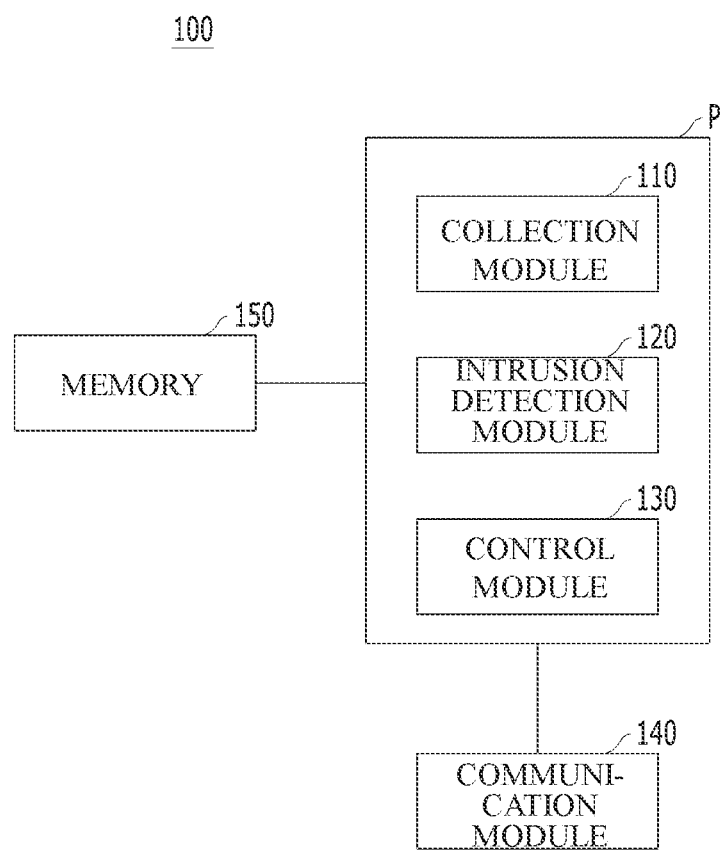
FIG. 2 is a diagram illustrating the configuration of a local client of an intrusion detection system for an IoT network according to an embodiment of the present invention.

FIG. 2 is a diagram illustrating the configuration of a local client of an intrusion detection system for an IoT network according to an embodiment of the present invention.

Referring to FIGS. 1 and 2, the local client 100 according to the embodiment may include a collection module (or collection engine) 110, an intrusion detection module (or intrusion detection engine) 120, a control module (or control engine) 130, and a communication module 140. Here, the configuration of the local client 100 is not limited to this, and the local client 100 may further include a memory 150 that stores a program for controlling the local client 100.

For example, the collection module 110, the intrusion detection module 120, and the control module 130 may be implemented by one processor or may be implemented by a separate processor.

In this embodiment, an example in which the collection module 110, the intrusion detection module 120, and the control module 130 are implemented by one processor P will be described.

The collection module 110 may be interconnected with the IoT device group 300 to collect data on the IoT devices of the IoT device group 300.

The data collected by the collection module 110 may be used as learning data for the intrusion detection module 120, and may be transmitted to the intrusion detection module 120 through the control module 130 or transmitted to the intrusion detection module 120.

The intrusion detection module 120 may include a local neural network model for IoT network intrusion detection, and perform learning based on the data collected by the collection module 110.

At the beginning of operation, the intrusion detection module 120 may perform learning on data based on an initial global neural network model transmitted from the control module 130 to generate an initial local neural network model, and generate model parameters (or weights $\{w_{t+1}\}$) updated after performing learning.

The intrusion detection module 120 may transmit learning content to the control module 130 and update a current local neural network model into the global neural network model provided from the control module 130.

At the beginning of operation, the control module 130 may transmit the initial neural network model transmitted from the central server 200 to the intrusion detection module 120.

The control module 130 may receive IoT device-related data collected by the collection module 110 to provide the IoT device-related data to the intrusion detection module 120, and store the IoT device-related data in the memory 150.

The control module 130 may update the local neural network model of the intrusion detection module 120 by transmitting the global neural network model transmitted from the communication module 140 to the intrusion detection module 120.

The control module 130 may receive the learning content of the intrusion detection module 120 and transmit the received learning content to the central server 200 through the communication module 140.

The communication module 140 is a component that performs communication with the central server 200, and may transmit information (e.g., the learning content of the local neural network model) transmitted from the control module 130 to the central server 200 and transmit information (e.g., the global neural network model) transmitted from the central server 200 to the control module 130.

In the above, the configuration and function/operation of each component of the intrusion detection system for an IoT network using blockchain-enabled FL according to an embodiment of the present invention were explained. Hereinafter, the operation of the intrusion detection system for the IoT network using blockchain-enabled FL according to an embodiment of the present invention will be described.

Figure 3:
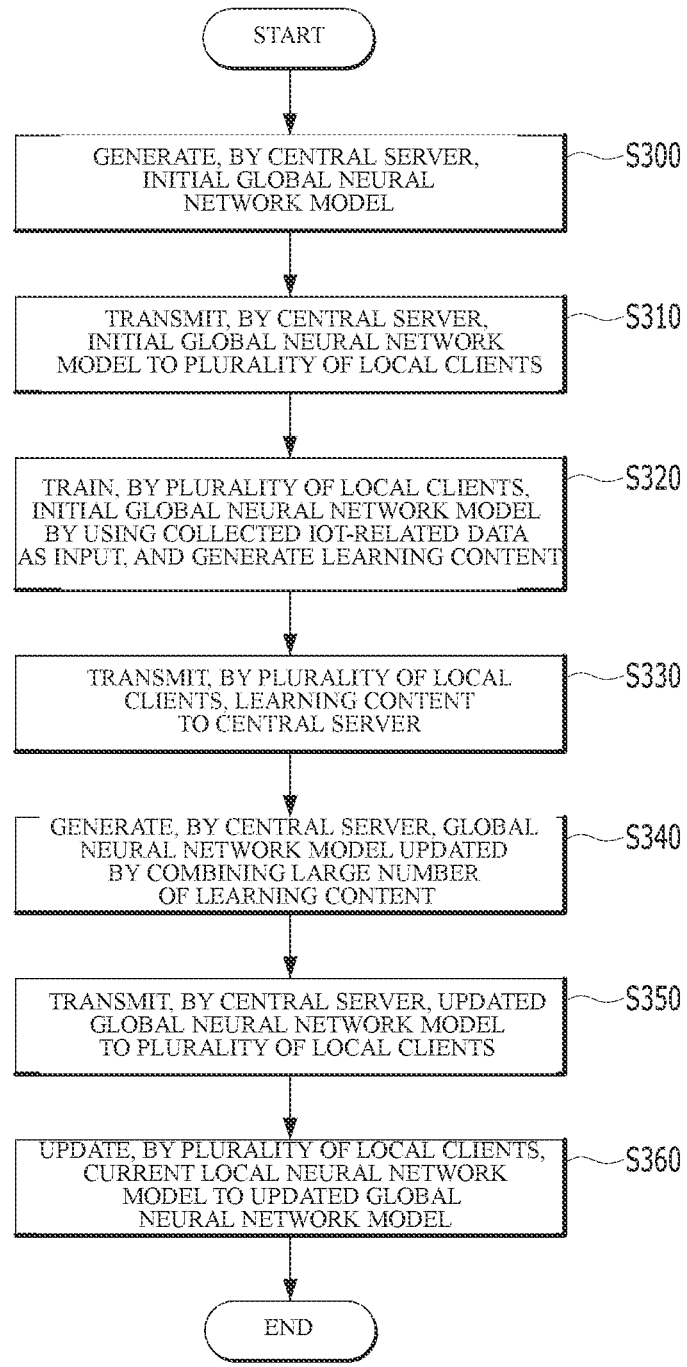
FIG. 3 is a flowchart illustrating the operation of an intrusion detection system for an IoT network using blockchain-enabled FL according to an embodiment of the present invention.
Figure 4:
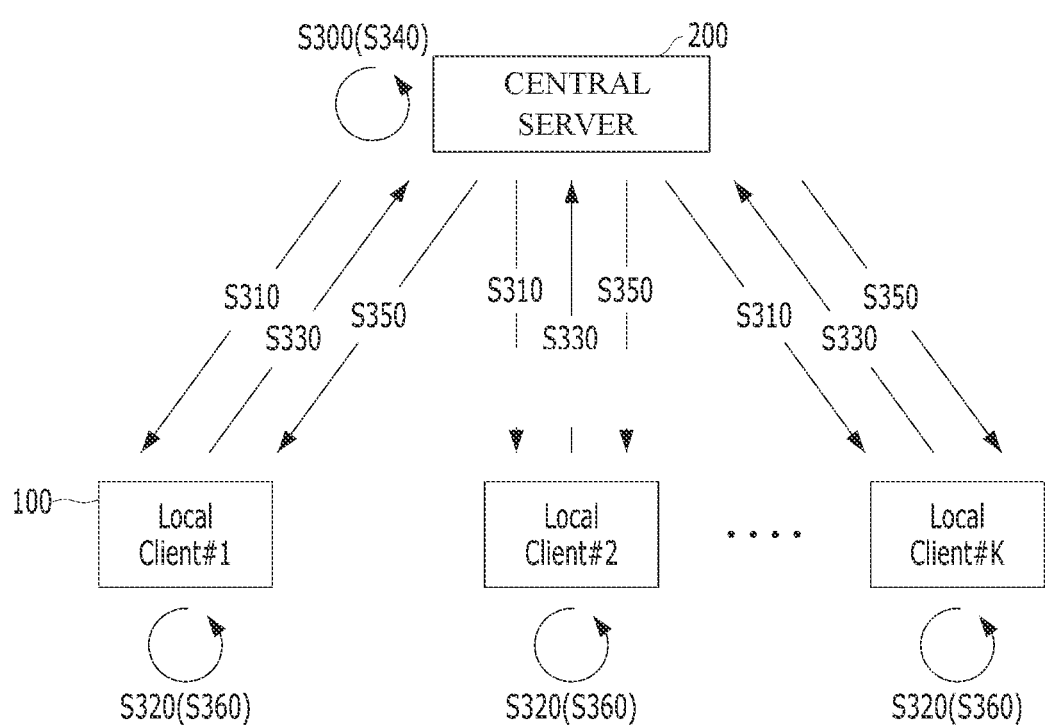
FIG. 4 is a diagram illustrating the interaction between components of an intrusion detection system for an IoT network using blockchain-enabled FL according to an embodiment of the present invention.

FIG. 3 is a flowchart illustrating the operation of an intrusion detection system for an IoT network using blockchain-enabled FL according to an embodiment of the present invention, and FIG. 4 is a diagram illustrating the interaction between components of an intrusion detection system for an IoT network using blockchain-enabled FL according to an embodiment of the present invention.

Each operation illustrated in FIGS. 3 and 4 may be performed by the intrusion detection system for the IoT network described with reference to FIGS. 1 and 2.

Referring to FIGS. 1 to 4, at the beginning of operation (t=0), in operation 300, the central server 200 may generate an initial global neural network model using IoT-related data held by the central server 200 itself.

In operation S300, the central server 200 may generate a weight (initial weight) w of the initial neural network model, and the number of hidden layers, neurons, epochs, etc., may be calculated.

Next, in operation S310, the central server 200 may transmit the generated initial neural network model to each of a plurality of local clients 100.

From the perspective of the local client 100, it can be interpreted that each of the plurality of local clients 100 downloads the initial neural network model.

In operation S320, each of the plurality of local clients 100 may input the collected IoT-related data (data at time t=1) into the initial global neural network model to train the initial global neural network model, thereby generating an initial local neural network model.

In operation S320, each of the plurality of local clients 100 may generate learning content (or updated model parameters) after learning, and for example, generate a local weight $w_{t-1}^R$.

In operation S320, each of the plurality of local clients 100 may use data collected from the IoT device group 300 under control (or interconnected) as input of the initial global neural network model.

Next, in operation S330, each of the plurality of local clients 100 may transmit learning content (or updated model parameters) to the central server 200.

In operation S330, only the learning content (or updated model parameters) may be transmitted to the central server 200, and personal information of the local client 100 is not transmitted.

Next, the central server 200 may generate a global neural network model updated by combining the learning content transmitted from each of the plurality of local clients 100 in operation S340, and for example, generate the updated model parameters.

In operation S340, the central server 200 may combine the learning content using a FedAvg method, but is not limited thereto.

Next, the central server 200 may transmit the updated global neural network model (or updated model parameters) to the plurality of local clients 100 in operation S350, and each of the plurality of local clients 100 may update a current local neural network model to the updated global neural network model in operation S360.

Next, operations S320 to 360 may be repeated. Accordingly, the local neural network models of the plurality of local clients 100 may be continuously updated, and thus, the intrusion detection performance of the local clients 100 can be improved.

As described above, according to an embodiment disclosed in the present invention, an intrusion detection system for an IoT network that can solve personal information protection issues, which are vulnerabilities of distributed and centralized ML approaches, can be provided.

According to an embodiment of the present invention, an intrusion detection system for an IoT network can be implemented to update model parameters by sharing only the model parameters rather than sharing user data with the outside to thereby protect user's personal information while allowing learning and interference to be completed on a client.

According to an embodiment of the present invention, an intrusion detection system for an IoT network that can prevent model parameter changes by external attacks, which is a vulnerability of Federated Learning (FL) approaches, by continuously updating the model parameters can be provided.

According to an embodiment of the present invention, an intrusion detection system for an IoT network can generate a global model by integrating the trained learning content of multiple clients from a central global server and performing learning on the same, rather than limiting updates of a local model to a single client, and update the local model based on this to detect external attacks of various patterns.

The effects of the present invention are not limited to the effects mentioned above, and other effects not mentioned will be clearly understood by those skilled in the art from the following description.

Since the content of the invention described in the problems to be solved above, the means for solving the problems, and the effects do not specify the essential characteristics of the claims, the scope of the claims is not limited by the matters described in the content of the invention.

Although embodiments of the present invention have been described in more detail with reference to the accompanying drawings, the present invention is not necessarily limited to these embodiments, and various modifications may be made within the scope without departing from the technical spirit of the present invention. Accordingly, the embodiments disclosed in the present invention are not intended to limit the technical spirit of the present invention, but to explain, and the scope of the technical spirit of the present invention is not limited by these embodiments. Therefore, it should be understood that the embodiments described above are illustrative in all respects and not restrictive. The protection scope of the present invention should be construed by the following claims, and all technical ideas within the scope equivalent thereto should be construed as being included in the scope of the present invention.

| [Description of reference numerals] | |
| --- | --- |
| 100: Local client | 110: Collection module |
| 120: Intrusion detection module | 130: Control module |
| 140: Communication module | 150: Memory |
| 200: Central server | 300: IoT device group |

What is claimed is:

1. An intrusion detection system for an Internet of Things (IoT) network, comprising:
a plurality of local clients, each configured to be interconnected with a corresponding one of a plurality of IoT device groups to establish an individual IoT network; and
a central server configured to be interconnected with the plurality of local clients and implemented on a blockchain network,
wherein at a beginning of operation, the central server is configured to:
generate an initial global neural network model by using data held by the central server, and
transmit the generated global neural network model to each of the plurality of local clients,
wherein each of the plurality of local clients is configured to:
input data collected from a IoT device group interconnected with each of the plurality of local clients into the initial global neural network model to train the initial global neural network model, and
generate an initial local neural network model, and
wherein each of the plurality of local clients includes a local neural network model for intrusion detection, and is further configured to update a current local neural network model based on an updated global neural network model transmitted from the central server.

2. The intrusion detection system of claim 1, wherein each of the plurality of local clients trains the current local neural network model by using data collected from the IoT device group interconnected with each of the plurality of local clients as input, and transmits learning content to the central server.

3. The intrusion detection system of claim 1, wherein the central server generates a global neural network model updated by combining learning content transmitted from each of the plurality of local clients, and transmits the updated global neural network model to each of the plurality of local clients.

4. The intrusion detection system of claim 1, wherein the central server includes a plurality of nodes implemented on the blockchain network, and the plurality of nodes generate an updated global neural network model based on learning content transmitted from a local client among the plurality of local clients and learning content transmitted from other nodes.

5. An operating method of an intrusion detection system for an Internet of Things (IoT) network, the system detecting an intrusion into an IoT network established by interconnecting each of a plurality of IoT device groups with a corresponding one of a plurality of local clients, each of the plurality of local clients including a local neural network model for intrusion detection, the method comprising:
   generating, by a central server implemented on a blockchain network, an initial global neural network model by using data stored by the central server at a beginning of operation;
   transmitting, by the central server, the generated initial global neural network model to each of the plurality of local clients;
   inputting, by each of the plurality of local clients, data collected from a IoT device group interconnected with each of the plurality of local clients into the initial global neural network model to train the initial global neural network model;
   generating, by each of the plurality of local clients, an initial local neural network model;
   training, by each of the plurality of local clients, a current local neural network model by using data collected from the IoT device group interconnected with each of the plurality of local clients as input and transmitting learning content to the central server;
   generating, by the central server, a global neural network model updated by combining the learning content transmitted from each of the plurality of local clients, and transmitting the generated global neural network model to each of the plurality of local clients; and
   updating, by each of the plurality of local clients, the current local neural network model based on the updated global neural network model.

6. The operating method of claim 5, wherein the central server includes a plurality of nodes implemented on the blockchain network, and
   wherein the generating, by the central server, the updated global neural network model includes generating, by the plurality of nodes, the global neural network model updated by combining the learning content transmitted from a local client among the plurality of local clients and learning content transmitted from other nodes.

* * * * *